Figure 1:
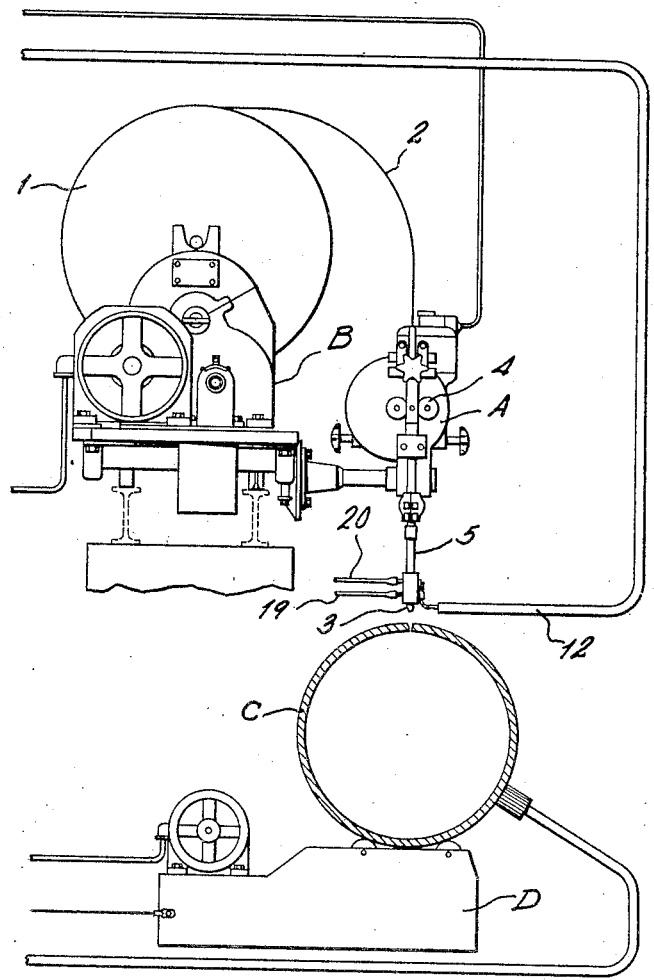

Dec. 22, 1942.  G. J. FRISCHMANN  2,306,050
ARC WELDING
Filed April 19, 1940  2 Sheets-Sheet 1

INVENTOR.
GEORGE J. FRISCHMANN
BY
*George J. Gill*
ATTORNEY.

Dec. 22, 1942.  G. J. FRISCHMANN  2,306,050
ARC WELDING
Filed April 19, 1940   2 Sheets-Sheet 2
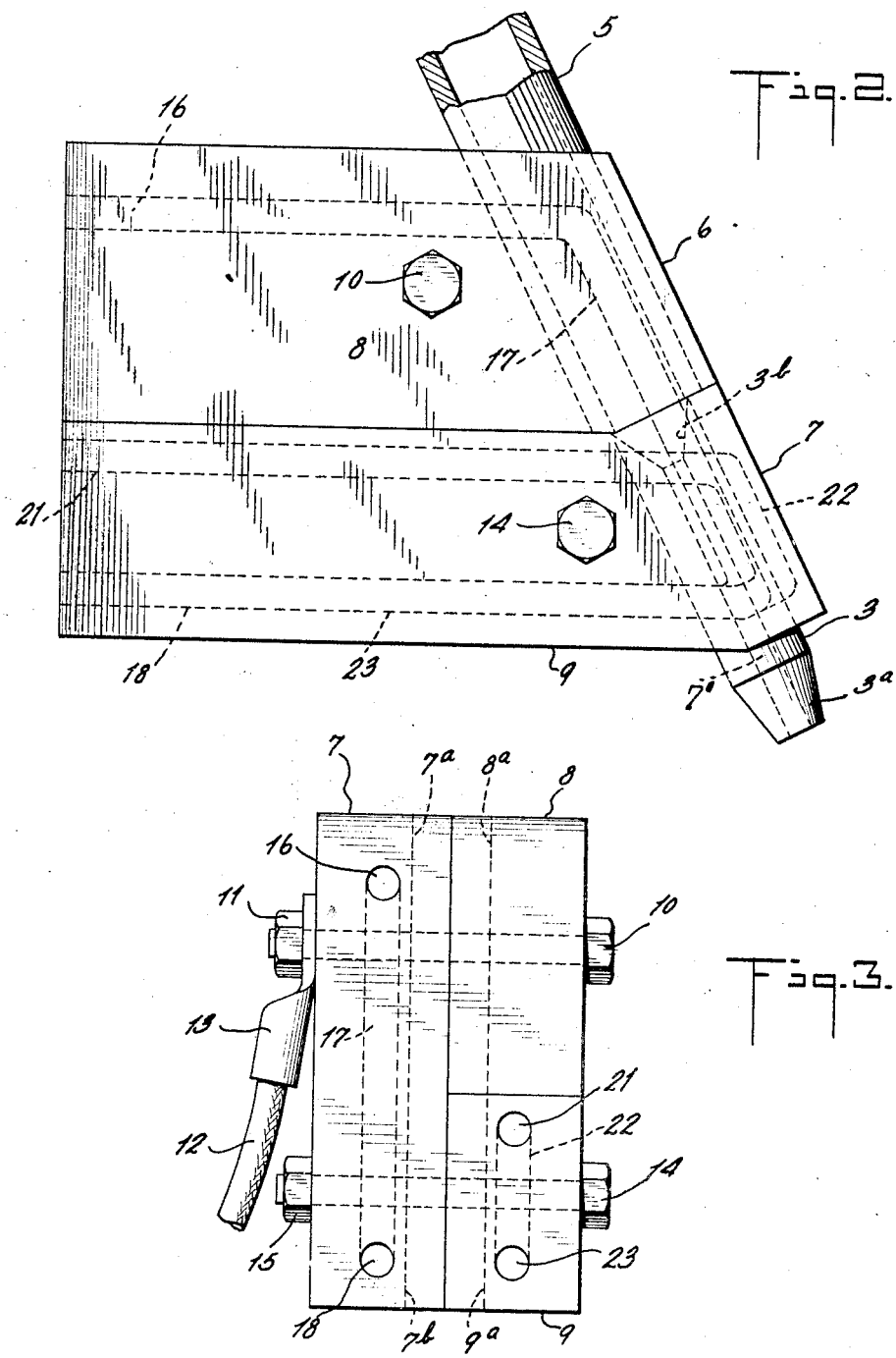
INVENTOR.
GEORGE J. FRISCHMANN
BY
George T. Gill
ATTORNEY.

Patented Dec. 22, 1942

2,306,050

UNITED STATES PATENT OFFICE 2,306,050

ARC WELDING

George J. Frischmann, Queens Village, N. Y., assignor to Metropolitan Engineering Company, Brooklyn, N. Y., a corporation of New York Application April 19, 1940, Serial No. 330,439

3 Claims. (Cl. 219—8)

The invention herein disclosed relates to automatic electric arc welding and more particularly to an arrangement for improving the production, quantity and quality, of automatic electric arc welders.

In electric arc welding, the welding is effected by establishing and maintaining an arc between an electrode and the work or piece to be welded. As the metallic electrode is moved along the work and fed to maintain the arc, a continuous bead of weld metal is deposited along the line followed by the electrode. In automatic arc welding a "welding head" is arranged so that there may be effected, by a mechanical arrangement, relative movement at a constant rate of the welding head with respect to the work. Control mechanism commonly electrically operated, is associated with the welding head. This mechanism includes means for automatically establishing and maintaining an electric arc between the electrode and the work, means for feeding the electrode into the arc, and means for introducing the welding current into the electrode as the electrode is fed. The first mentioned means is commonly so arranged as to maintain a substantially constant voltage across the arc, i. e., between the electrode and the work.

In automatic, metallic arc welding, the most common and most widely used system, the electrode is a continuous wire of about one-eighth to three-sixteenths of an inch in diameter fed automatically from a reel. For rapid production work such an arc welder uses a comparatively heavy current (approximately two hundred to four hundred and fifty amperes or more) and this current is flowing a large portion of the time (about fifty to ninety-five percent of the time). The electrode nozzle which is a copper tip having an axial bore through which the electrode passes provides friction contact to transmit the heavy welding current to the electrode and guides the electrode steadily to the joint in the work. This nozzle is directly subjected to the intense heat of the arc and in addition the passage of such a heavy current between the nozzle and the electrode and through the electrode generates a great quantity of heat. This intense heat to which the nozzle is subjected appears to be the chief cause of rapid deterioration and failure of the nozzle.

The wire that constitutes the electrode and that is commonly used in arc welding is coated with a "washing" or "dust" coating of a fluxing material. This coating is provided to cause a steadier arc and a more uniform weld of better characteristics. While this coating is not sufficiently heavy to prevent contact between the nozzle and the electrode, when uniformly distributed, under certain conditions it may accumulate locally in sufficient quantity to seriously interfere with good electrical contact.

In practice it has been found that these conditions exist in the nozzle construction that has been utilized prior to this invention, when the arc welder is operated steadily at high currents for an appreciable time. The observations of operation conditions indicate that sufficiently high temperatures are reached at the contact making surfaces of the nozzle and electrode to cause this thin "dust" coating to become slightly sticky or tacky and thus to stick, pack onto and accumulate along the contacting surfaces, and thus cause faulty contact, "arcing" and "spitting." This in turn increases the heating at this point and very shortly the nozzle will weld to the wire and prevent further operation of the welder. Before the wire actually welds to the nozzle sufficiently to effect a shut down of the welder, it sticks and breaks free again many times. This causes an erratic operation of the welder, irregular feeding of the electrode wire and prevents the maintenance of ideal welding conditions. In order to produce sound, uniform welds successfully at high speeds by machine operation, it is necessary that the regulation of electrode feed be speedy and precise. The equipment must be capable of establishing a suitable welding arc and it must hold this arc constantly without appreciable variation throughout the length of the weld. Thus, before a failure of the nozzle either by the welding thereto of the electrode or the burning out of the nozzle, which frequently occurs, there is a period of time in which the welds are not sound, uniform welds, as the conditions necessary for such welds are not and cannot be maintained.

In actual practice, in making a certain production weld with the automatic metallic arc process, it was found necessary to replace the nozzle at approximately each three hundred pieces. On another similar but light weld, the number of pieces obtained per nozzle was about four hundred. This resulted in a high proportion of faulty welds and in a high maintenance cost. In addition, production was reduced because of the necessity for replacing the nozzle at frequent intervals (approximately once a day).

The principle object of this invention is to provide a construction and arrangement by means of which the nozzle or welding tip of an automatic arc welding machine is given a greatly increased useful life. Another object of the invention is to reduce the percentage of defective, inferior, imperfect welds caused by failure of the nozzle to function properly. A further object of the invention is to reduce both the maintenance required and the "outage" time of the machine for repair or replacement of the nozzle. By "outage" time is meant that time during which the machine is not available for productive work due to the need for service or repair.

The foregoing objects and certain advantages that will hereinafter appear are realized in accordance with the invention by providing an arrangement for extracting the heat from the nozzle and preventing the nozzle from readily attaining a temperature at which these conditions prevail. One arrangement for effecting this purpose is to apply a water cooling to the nozzle. The specific arrangement utilized is one in which a stream of cool water is brought into heat transfer relation with respect to the nozzle. Cool water from an ordinary source of supply such as a well is connected to one end of a cooling water passage arranged in heating transfer relation with respect to the nozzle and the other is connected to the drain. Both connections are made to the passage arranged in heat transfer relation to the nozzle through rubber connections. The water that has been used is sufficiently pure to be an extremely poor conductor of electricity and since the connections with the water carrying pipes are made with an insulating material there is no grounding of the current in sufficient quantity to noticeably affect the automatic controls that operate to maintain a constant arc.

An electrical arc welder embodying the invention is shown diagrammatically in the accompanying drawings together with an arrangement for water cooling the nozzle. The drawings include:

Fig. 1 which is a diagrammatic illustration of an automatic electrical arc welder;

Fig. 2 which is a side elevation of the nozzle end of the welding head; and

Fig. 3 which is an end view of the same.

With the exception of the cooling arrangement for the nozzle, the arc welder illustrated in the drawings is one that is common and well known in the art. Where the welder is to be used for welding straight seams, the welding head A is secured onto a carriage B that moves the head along the joint in the work C. The carriage also carries an electrode reel 1 from which the electrode 2 is unwound and passes through the welding head. This electrode 2 is fed through the nozzle 3 by means of feed rolls 4. Where circular seams are welded, a turning mechanism D is utilized for turning the work at a steady rate, the welding head remaining fixed. In some arrangements the welding head is inclined at a slight angle to the work.

The welding head, includes a tubular guide 5 through which the electrode passes to the nozzle 3. In the arrangement illustrated in Figs. 2 and 3 the nozzle 3 is secured to the end of the tubular guide 5 by a clamp 6. The nozzle 3 is cylindrical in form having a conical end section 3a and a conical recess 3b at the opposite end for guiding the electrode from the hollow guide 5 into the narrow passage 7' through the nozzle. The passage 7' through the nozzle is necessarily narrow or small to provide the frictional contact between the nozzle and the electrode to transmit the heavy welding current to the electrode and to guide the electrode steadily and straight into the joint in the work.

The particular clamp 6 that is illustrated for securing the nozzle 3 with the end thereof abutting against the end of the guide 5 on the welding head consists of three blocks 7, 8 and 9. The block 7 is of a width to embrace the greater portion of the nozzle 3 and a portion of the end of the guide 5 of approximately the same length as the nozzle. It is provided with communicating semi-circular recesses 7a and 7b. The recess 7a is of larger radius than the recess 7b and receives the end portion of the guide 5 of the welding head. The nozzle 3 is received in the recess 7b. The block 8 serves with the block 7 as a clamp for the end portion of the guide 5 of the welding head. This block has a semi-circular recess 8a which with the recess 7a in the block 7 forms a cylindrical recess in which the end portion of the guide 5 is received. The block 9 forms with the lower portion of the block 7 a clamp for the nozzle. This block is provided with a semi-circular recess 9a which together with the recess 7b in the block 7 receives the nozzle. The block 8 is secured to the block 7 by a bolt 10 and a nut 11. The cable 12 that carries the welding current to the electrode 2 is secured to the block 7 through a connector 13 that is secured on the bolt 10 in contact with the block 7. The block 9 is secured to the block 7 by a bolt 14 and a nut 15, the bolt 14 extending through the blocks 9 and 7.

In the block 7, there is provided a water passage that includes a branch 16 extending from the end of the block to a point adjacent the semi-circular groove 7a in which the end portion of the welding head guide 5 is received, a branch 17 that extends along the side of the semi-circular recesses 7a and 7b and a branch 18 extending to the rear edge of the block. The branch 17 connects the branches 16 and 18. Water or other cooling fluid is delivered to the branch 18 through a rubber connection 19 with a source of supply, passes along the branch 18 to the clamping end of the block, along the branch 17 and through the branch 16 which is connected through a rubber tube 20 to the drain or waste.

The block 9 is likewise provided with a water passage that includes a branch 21 extending from the rear edge of the block to a point adjacent the forward or nozzle clamping end of the block, a branch 22 which extends along the nozzle clamping end of the block parallel to the axis of the nozzle and a branch 23 which extends to the rear of the block. The passages 21 and 23 are connected to the rubber connections 20 and 19 respectively. Water entering the branch 23 passes through the branch 22 and out through the branch 21. By entering the water in the branches 18 and 23 the coolest water comes in heat transfer relation with the hottest portion of the nozzle so that the highest efficiency of transfer of heat to the stream of water is attained.

It will be seen that due to the fact that the blocks 7 and 9 are tightly clamped to the nozzle and the end portion of the guide 5 of the welding head, the blocks are in the relation to the nozzle and the end portion of the welding head such that there is a transfer of heat from the nozzle and the end portion of guide 5 to the blocks by conduction. In the same manner, the heat passes through the blocks to the stream of water passing through the water passages in the blocks 7 and 9. In this way, by providing a continuous stream of relatively cool water, the nozzle may be maintained at a comparatively low temperature. The arrangement which is disclosed also provides a much simpler way of securing the nozzle to the end of the guide. Heretofore, these nozzles have been provided with a threaded extension that is threaded into the end of the hollow guide 5. The clamping arrangement illustrated makes a much cheaper construction for the nozzle and requires less time for replacing a nozzle.

Using the arrangement described above, welds have been produced of the same kind and on the same machine as described above in which the ordinary nozzle had to be replaced every three hundred or four hundred and fifty pieces. With the water cooling arrangement, nine thousand and fourteen thousand pieces have been obtained respectively per nozzle. This represents an improvement of thirty to one in the life of a nozzle and in addition, the percentage or proportion of defective work is materially and substantially reduced. It has been customary to use soft copper nozzles to obtain the desired conductivity. With the water cooled nozzle, harder alloys of lower conductivity may be used, with even better results.

In operation, the cooled nozzle remains free of pasty or packed fluxing material, any loose flux falling through during the welding operation as powder. Thus, the nozzle is allowed to wear out normally by the friction of the moving electrode on the nozzle rather than falling due to arcing on the contact surfaces and consequent rapid burning away of the nozzle or the welding of the nozzle to the electrode. Because of this, advantage may be taken of the available alloys having a much higher wear resistance than copper for the nozzle material. Such alloys as heat treated cuprous alloy or even hardened ferrous alloys may be used.

From the foregoing it will be seen that by this invention, materially better and greater production is obtained with the automatic arc welder. It will be obvious that various changes may be made by those skilled in the art in the details of the embodiment of the invention illustrated in the drawings and described in detail above within the principle and scope of the invention as expressed in the appended claims.

I claim:

1. In an automatic, metallic, arc welding machine having a welding head through which a wire electrode is continuously fed into the arc; the combination comprising an electrode guide tube supported by the welding head, a welding nozzle arranged in butt-ended relation to the guide tube to receive and guide the electrode to the work and form a sliding, frictional electrical contact therewith, the nozzle having an opening therethrough of lesser diameter than the guide tube and a conical lead-in section adjacent the guide tube. and a clamping block engaging the nozzle and the guide tube and securing the nozzle in butt-ended relation to the guide tube.

2. In an automatic, metallic, arc welding machine having a welding head through which a wire electrode lightly coated with a non-conducting fluxing material is continuously fed to the arc and in which the electrode feeding mechanism is electrically controlled to maintain a constant voltage across the arc; the combination comprising an electrode guide tube supported by the welding head, a welding nozzle arranged in butt-ended relation to the guide tube to receive and guide the electrode to the work and form a sliding frictional electrical contact therewith for the flow of welding current to the electrode, a metallic clamping block having a system of water passages therethrough securing the nozzle to the end of the guide tube and directly in contact therewith, a water supply conduit of electrical insulating material connected between a primary source of water and one end of said water passage. and a discharge conduit of electrical insulating material connected between the other end of said water passages and a drain, whereby the nozzle is maintained at a temperature too low to cause fusion or impacting of said fluxing material on the contacting surfaces of the nozzle.

3. In an automatic, metallic, arc welding machine having a welding head through which a wire electrode coated with a non-conducting fluxing material is continuously fed into the arc, the combination comprising an electrode guide tube supported by the welding head, a metallic welding nozzle arranged to receive and guide the electrode to the work and form the electrical contact with the electrode, and a combined water jacket and clamp for securing the nozzle to the guide tube including two separate pieces arranged to clamp the guide tube and nozzle in operative relation and having passages therethrough for a liquid medium.

GEORGE J. FRISCHMANN.